April 29, 1952 — B. H. SIMPSON — 2,595,010
BUTTER WARMING RECEPTACLE
Filed June 11, 1947 — 2 SHEETS—SHEET 1

Inventor:
B. H. Simpson
Attorney

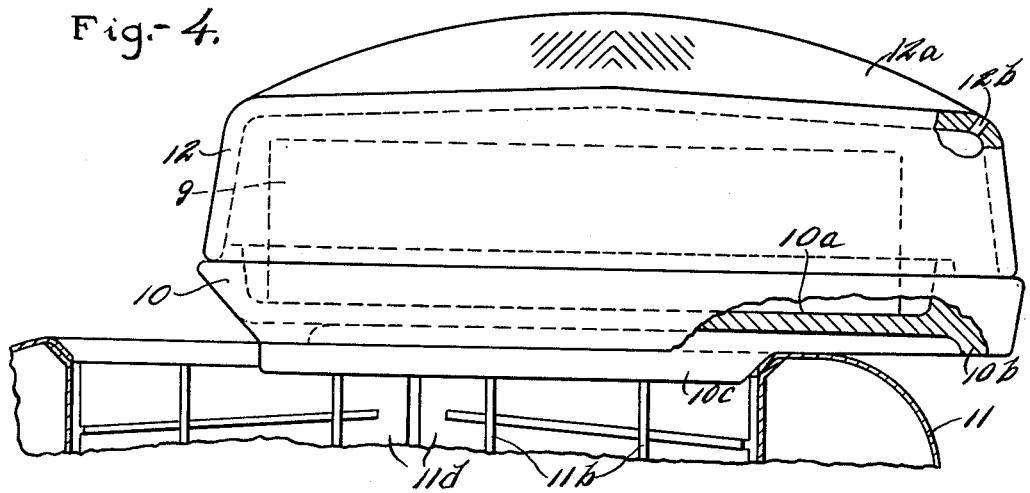
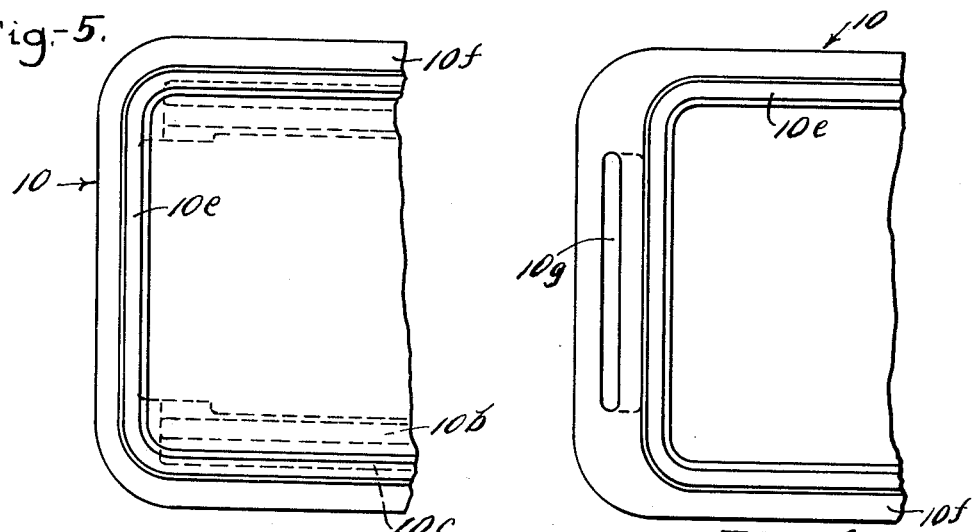
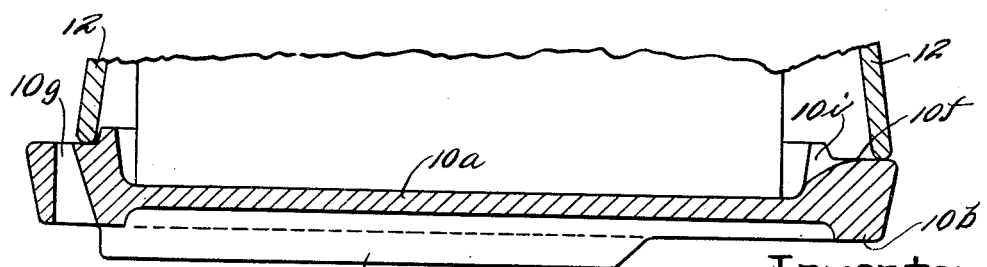

Patented Apr. 29, 1952

2,595,010

UNITED STATES PATENT OFFICE 2,595,010

BUTTER WARMING RECEPTACLE

Benjamin Harold Simpson, Minneapolis, Minn.

Application June 11, 1947, Serial No. 753,867

5 Claims. (Cl. 126—246)

This invention relates to a warming device, and while the same might be used for warming various articles or materials, it particularly is designed for warming such material as butter. It often happens that butter, particularly if kept in a refrigerator, becomes quite hard and is thus inconvenient to use or spread. It is desirable to warm the butter somewhat so that it will be softened and can be easily cut or spread.

It is an object of this invention to provide a very simple and efficient warming device and one which will uniformly heat and soften a piece or block of butter.

It is a further object of the invention to provide a warming device constructed and arranged to be placed on a heating means such as a bread toaster, said device comprising a dish-like receptacle having a chamber therein adapted to receive the butter, together with a cover resting on said receptacle, said receptacle and cover being constructed and arranged to provide an opening through which heat or heated air may enter said chamber or cover.

It is a further object of the invention to provide a warming device adapted to be placed upon a heating means comprising a receptacle having a chamber therein adapted to receive the material to be warmed, said receptacle having a ledge adjacent its top, a cover upstanding from said receptacle and adapted to rest on said ledge, said cover being movable to close the said chamber and also being movable to provide an opening into said chamber and cover either at the end of said receptacle or adjacent the end thereof.

It is more specifically an object of the invention to provide a warming device adapted to be placed on a heating means such as a toaster, said device comprising a shallow dish-like receptacle having a chamber therein adapted to receive the material to be warmed, the same preferably having means at its bottom adapted to be disposed in the bread-receiving slots of a toaster, said receptacle having a ledge adjacent its top extending thereabout, a dish-like cover for said receptacle preferably of considerable height, the same resting on said ledge, said cover being movable to position to close said chamber and also being movable to position to overhang one end of said receptacle or to extend over an opening through said receptacle to provide a passage into said chamber and cover whereby heat or heated air may enter said chamber and cover to uniformly warm and soften said material.

It is still further an object of the invention to provide such a device as set forth above in which said cover may be provided with one or more openings adjacent its top whereby air can circulate from said heating means through said chamber and cover.

These and other objects and advantages of the invention will be fully set forth in the following description made in connection with the accompanying drawings in which like reference characters refer to similar parts throughout the several views and in which:

Fig. 4 is a view partly in central vertical longitudinal section and partly in side elevation of the parts shown in Fig. 1;

Fig. 5 is a partial plan view of a part of the device;

Fig. 6 is a view similar to Fig. 5 showing a modified form of the invention;

Fig. 7 is a partial view in central vertical longitudinal section of the form shown in Fig. 6.

Figure 1:
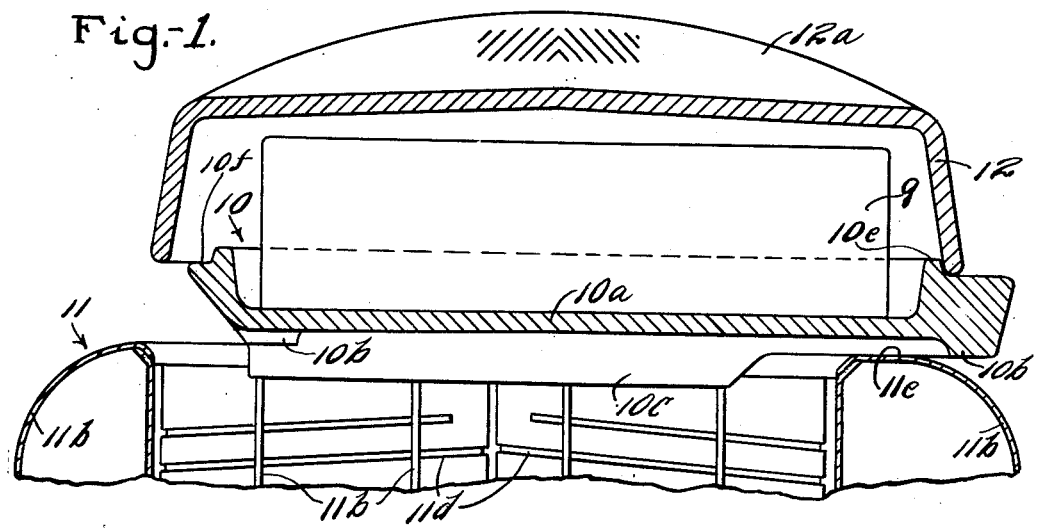
Fig. 1 is a central vertical longitudinal section through the device and through a portion of a toaster supporting the same.
Figure 2:
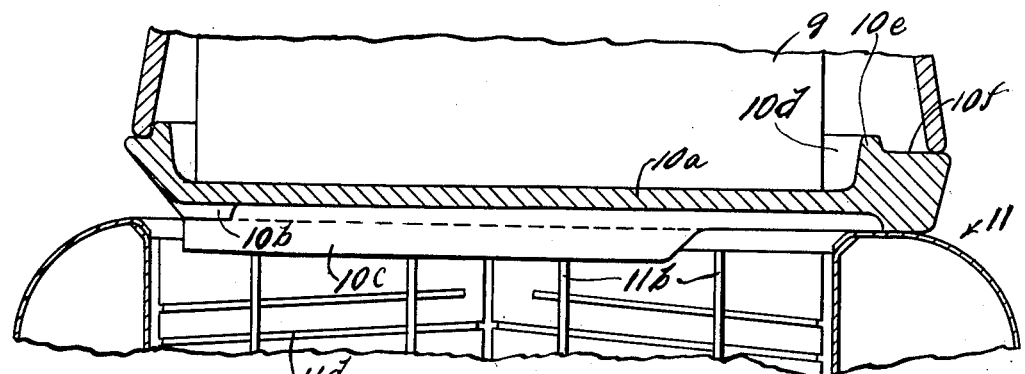
Fig. 2 is a view similar to Fig. 1 showing the parts of a device in different positions.
Figures 3, 8:
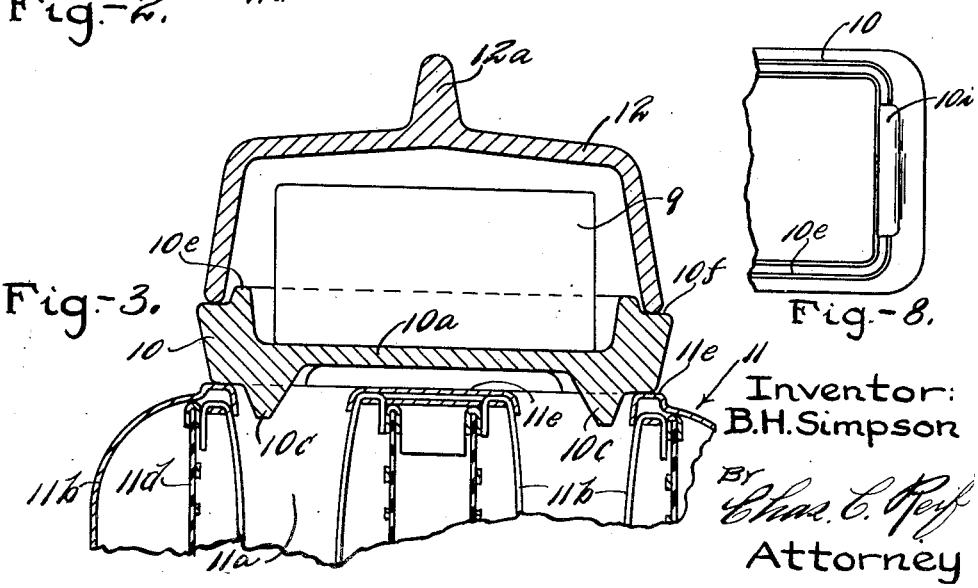
Fig. 3 is a central transverse vertical section of the parts shown in Fig. 1.
Fig. 8 is a partial plan view of one of the parts showing a modification.

Referring to the drawings, a device is shown comprising a receptacle 10. While this receptacle might be variously formed, in the embodiment of the invention illustrated it is shown as of shallow dish-like form, the same being substantially rectangular in plan and having rounded corners. Receptacle 10 has a bottom 10a and a bottom flange 10b extends from and extends around bottom 10a. The bottom of flange 10b forms the supporting surface for receptacle 10. Receptacle 10 is also preferably provided with depending ribs 10c disposed respectively adjacent the sides of bottom 10a, which ribs are constructed and arranged to be conveniently received in the bread-receiving slots or openings 11a of an electrical toaster 11. Said toaster comprises the usual casing 11b, the members 11c between which the pieces of bread are disposed and the heating elements 11d. A further description of said toaster will be unnecessary. As shown in Figs. 2 and 3, the bottom of flange 10 rests upon a top surface 11e of casing 11b. Receptacle 10 has a chamber 10d therein which is adapted to receive the material 9 to be warmed. Said receptacle has a flange 10e surrounding chamber 10d at the top thereof and also is provided with a ledge 10f surrounding flange 10e. The flange 10b is of slightly less height at one end of the receptacle so that bottom 10a slopes downwardly slightly toward one end which is the end at the left, as seen in Figs. 1 and 2. A cover 12 is provided and while this might take various forms, in the embodiment of the invention illustrated it is shown as of inverted dish-like form. The cover 12 is adapted to have its lower edge rest on the ledge 10f. Cover 12 is provided with a central rib 12a projecting from its top which constitutes a handle. The sides of cover 12 at their lower end are disposed rather close to flange 10e so that little movement of the cover laterally is permitted. The ledge 10f is shown as considerably wider at one end of the receptacle than the other, which is the end at the right as seen in Figs. 1 and 2.

In operation the receptacle 10 will be placed upon the heating means and if this heating means is a toaster, the receptacle will rest upon the surface 11e, as shown in Figs. 1, 2 and 3, and ribs 10c will be disposed in the bread-receiving openings or slots 11a. These ribs 10c will prevent any appreciable lateral movement of the receptacle on said toaster. Ribs 10c extend throughout the major part of the length of receptacle 10, as shown in Figs. 1 and 2. The material 9 will be placed in chamber 10d with cover 12 removed and will be supported on bottom 10a. The cover 12 will now be placed in position on ledge 10f, as shown. The cover 12 can be moved to the position shown in Fig. 2 where its left hand, as shown in Fig. 2, is adjacent the flange or rim 10e. In this position the cover tightly closes the chamber 10d and the chamber in the cover. The heat from the heating means will thus be applied through the material of receptacle 10. The cover 12 can be moved endwise on ledge 10f to have its end overhang the end of receptacle 10, as shown in Fig. 1. A passage is thus provided into chamber 10d and into the cover. Heat from the heating means can thus pass through said passage and will assist in warming or softening the material 9. By having the heat or heated air thus pass into the chamber in the receptacle and in the cover, a more uniform heating of the material is obtained. If heat is applied only to the bottom of the material, this portion is apt to be overheated or melted before the top of the piece or block is desirably heated. By having the heat pass into the chamber in the receptacle and the chamber in the cover, a uniform heating and softening of the material can be had. The size of the passage into the receptacle can be regulated by moving cover 12.

In Figs. 6 and 7 a slightly different form of the device is shown. Ledge 10f is of considerable width at both ends of receptacle 10 and an opening or passage 10g is formed through the end of receptacle 10 at one side of chamber 10d, which passage is shown as tapering toward its upper end. Instead of cover 12 overhanging the end of receptacle 10, it can be moved to extend partially over or completely over the top of passage 10g so that heat or heated air from the heating means can pass into chamber 10d and into the cover. This will provide a uniform heating of the material as above described. Cover 12 can be provided with one or more openings 12b adjacent the top of said cover. Heated air passing into the receptacle and cover can thus pass out of the opening or openings 12b to afford a circulation of air through the receptacle and cover.

In Figs. 7 and 8 another modification is shown. The member 10 at its right hand end, as shown in Figs. 7 and 8, is provided with a recess 10i of elongated form which extends into the chamber 10d. Recess 10i extends along the end of chamber 10d and the bottom of the recess slopes downwardly into chamber 10d at the inner side of said recess. When cover 12, as shown in Fig. 7, is moved to the left to partially or wholly extend over the top of passage 10g, the right hand end of the cover will be over the recess 10i. Heated air can then pass through passage 10g into the chamber 10d and the inside of cover 12 and can pass out through recess 10i under the edge of cover 12. Circulation is thus provided for the heated air and a uniform heating of the material is secured.

From the above description it will be seen that I have provided a very simple and efficient warming device for warming such material as butter. While different materials could be used for the device, the preferred material is glass. The receptacle 10 and cover can be easily pressed and molded so that the same can be quite inexpensively made. The material will be such that it will withstand heat so that the device will be quite durable. It is apparent that the device will have a high degree of utility for the purpose intended.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A warming device adapted to be placed on a heating means having in combination, a receptacle having a chamber therein adapted to receive the material to be warmed, said receptacle having a ledge adjacent its top, a cover for said receptacle adapted to rest on said ledge, said ledge being wider at one side of said receptacle than at the other side of said receptacle, said cover having a transverse dimension greater than the transverse dimension of said chamber and said narrower side of said ledge and said cover being movable on said ledge to a position to close the chamber in said receptacle and being movable to another position to overhang said ledge and provide an opening into said chamber and cover.

2. A warming device adapted to be placed upon a heating means having in combination, a receptacle having a bottom and a flange extending about said bottom and depending therefrom forming the supporting means for said receptacle, said bottom sloping downwardly toward one end thereof, said receptacle having an outwardly projecting ledge extending thereabout adjacent its top, a dish-like cover adapted to rest on said ledge, said cover being movable to one position to close said chamber and being movable to another position to provide a passage extending upwardly into said chamber and cover.

3. The structure set forth in claim 1, said cover having openings adjacent its top whereby a circulation of air may take place from said first mentioned opening through said chamber and cover.

4. The structure set forth in claim 2, said receptacle having a passage extending upwardly through said ledge at one end thereof whereby when said cover is moved to said last mentioned position it will extend over said passage whereby a circulation of air can take place through said passage into said receptacle and cover.

5. A warming device adapted to be placed upon a heating means having in combination, a receptacle having a bottom and a flange extending about said bottom and depending therefrom forming the supporting means for said receptacle, spaced separate parallel ribs depending from said flange, said receptacle having an outwardly projecting ledge extending thereabout adjacent its top, a dish-like cover adapted to rest in inverted position on said ledge and having an opening in its top, said ledge having an upwardly extending passage therethrough at one end, said cover being movable to a position with one end inwardly of said passage and being movable to another position where an inner edge thereof is beyond said passage whereby air can pass upwardly through said passage into said receptacle and cover and pass out through said opening.

BENJAMIN HAROLD SIMPSON.

REFERENCES CITED

The following references are of record in the file of this patent:

UNITED STATES PATENTS

| Number | Name | Date |
|---|---|---|
| 251,214 | Golding | Dec. 20, 1881 |
| 950,239 | Oskamp | Feb. 22, 1910 |
| 1,316,006 | Wagner | Sept. 16, 1919 |
| 1,542,115 | Weis | June 16, 1925 |
| 1,587,023 | Mottlau | June 1, 1926 |
| 1,714,536 | Wooderson | May 28, 1929 |
| 1,787,171 | Rohrmann | Dec. 30, 1930 |
| 1,793,298 | Alaj | Feb. 17, 1931 |
| 1,948,778 | Zoia | Feb. 27, 1934 |
| 1,978,175 | Stalle | Oct. 23, 1934 |
| 2,080,283 | Lowenfels | May 11, 1937 |
| 2,093,175 | Smith | Sept. 14, 1937 |